(12) United States Patent
Gacsal et al.

(10) Patent No.: US 10,661,820 B2
(45) Date of Patent: May 26, 2020

(54) DEVICE FOR ADJUSTING A STEERING COLUMN OF A MOTOR VEHICLE, AND STEERING SYSTEM

(71) Applicant: Robert Bosch Automotive Steering GmbH, Schwäbisch Gmünd (DE)

(72) Inventors: Denes Gacsal, Eger (HU); Gabor Andor Fuchs, Felsoezsolca (HU); Miklos Szabo, Eger (HU)

(73) Assignees: Robert Bosch Automotive Steering GmbH, Schwäbisch Gmünd (DE); Robert Bosch GmbH, Stuttgart (DE)

( * ) Notice: Subject to any disclaimer, the term of this patent is extended or adjusted under 35 U.S.C. 154(b) by 239 days.

(21) Appl. No.: 15/747,373

(22) PCT Filed: Jul. 1, 2016

(86) PCT No.: PCT/EP2016/065470
§ 371 (c)(1),
(2) Date: Jan. 24, 2018

(87) PCT Pub. No.: WO2017/016794
PCT Pub. Date: Feb. 2, 2017

(65) Prior Publication Data
US 2018/0215407 A1    Aug. 2, 2018

(30) Foreign Application Priority Data

Jul. 24, 2015   (DE) .................. 10 2015 112 086

(51) Int. Cl.
*B62D 1/183* (2006.01)
*B62D 1/184* (2006.01)
*B62D 1/187* (2006.01)

(52) U.S. Cl.
CPC ............ *B62D 1/183* (2013.01); *B62D 1/184* (2013.01); *B62D 1/187* (2013.01)

(58) Field of Classification Search
CPC ..................................... B62D 1/187
See application file for complete search history.

(56) References Cited

U.S. PATENT DOCUMENTS 3,693,997 A * 9/1972 Dreyer .................. B62D 1/181
                                                      280/775
6,095,012 A * 8/2000 Lutz ...................... B62D 1/184
                                                      74/493

(Continued)

FOREIGN PATENT DOCUMENTS

CN     203623767 U    6/2014
DE     102 45 236 A1  7/2003

(Continued)

OTHER PUBLICATIONS

International Search Report corresponding to PCT Application No. PCT/EP2016/065470, dated Oct. 18, 2016 (German and English language document) (5 pages).

*Primary Examiner* — James A English
(74) *Attorney, Agent, or Firm* — Maginot, Moore & Beck LLP

(57) ABSTRACT

A steering system for a motor vehicle includes a steering column and a device for adjusting the steering column. The device includes a bearing block, a first guide mechanism, and a second guide mechanism. A housing of the steering column is adjustably mounted in the bearing block. The first guide mechanism is configured to adjust a height of the steering column in the bearing block. The second guide mechanism is configured to adjust an inclination of the housing, and includes at least one first guide plate and at least one second guide plate that are each movably connected to the housing of the steering column and to the bearing block so as to be axially movable with an adjustment of the inclination of the housing.

17 Claims, 4 Drawing Sheets

(56) References Cited

U.S. PATENT DOCUMENTS

| | | | | |
|---|---|---|---|---|
| 6,474,189 | B1* | 11/2002 | Koellisch | B60K 23/02 |
| | | | | 280/775 |
| 6,829,962 | B2* | 12/2004 | Cartwright | B62D 1/184 |
| | | | | 280/775 |
| 6,923,086 | B2* | 8/2005 | Muller | B62D 1/184 |
| | | | | 280/775 |
| 9,039,042 | B2* | 5/2015 | Moriyama | B62D 1/187 |
| | | | | 280/775 |
| 2002/0020245 | A1* | 2/2002 | Gaukel | B62D 1/184 |
| | | | | 74/493 |
| 2004/0134301 | A1* | 7/2004 | Ko | B62D 1/184 |
| | | | | 74/492 |
| 2012/0146316 | A1* | 6/2012 | Roach | B62D 1/184 |
| | | | | 280/779 |
| 2013/0205993 | A1 | 8/2013 | Stoddard et al. | |
| 2016/0244086 | A1* | 8/2016 | Moriyama | B62D 1/184 |

FOREIGN PATENT DOCUMENTS

| | | |
|---|---|---|
| DE | 601 13 362 T2 | 7/2006 |
| DE | 603 17 961 T2 | 12/2008 |
| DE | 10 2009 001 324 A1 | 9/2010 |
| EP | 2 146 889 B1 | 1/2011 |
| EP | 2 125 487 B1 | 3/2015 |

\* cited by examiner

DEVICE FOR ADJUSTING A STEERING COLUMN OF A MOTOR VEHICLE, AND STEERING SYSTEM

This application is a 35 U.S.C. § 371 National Stage Application of PCT/EP2016/065470, filed on Jul. 1, 2016, which claims the benefit of priority to Serial No. DE 10 2015 112 086.0, filed on Jul. 24, 2015 in Germany, the disclosures of which are incorporated herein by reference in their entirety.

The disclosure relates to a device for adjusting a steering column of a motor vehicle.

The disclosure furthermore relates to a steering system for a motor vehicle.

BACKGROUND

Steering column mountings which can be of fixed or else adjustable design are considered to be well known. Steering column mountings having adjustment devices which are operated by electric motor and permit adjustment of the height and/or inclination of the steering column are known in particular in the passenger vehicle sector. Such steering column mountings are also known in the utility vehicle sector. However, the electric motor adjustment has proven to be very slow and is also limited to a comparatively small adjustment range. In particular in the utility vehicle sector, however, steering column mountings which have a large adjustment range are required. For this purpose, use is customarily made of constructions in which the steering column can generally be pivoted manually into an approximately vertical position in order therefore to simplify the entry into or the exit from the vehicle.

DE 10 2009 001 324 A1 discloses a steering column mounting with a support housing for a steering column which is mounted in an at least rotatably arranged steering column holder, as a result of which at least the inclination of the steering column is changeable, and wherein at least one first latching mechanism and at least one second latching mechanism are provided, which latching mechanisms are connectable to the support housing, and that a rapid clamping device is provided for latching in one of the latching mechanisms, as a result of which the steering column is latchable in a first inclination position or in a second inclination position.

It is desirable here for the steering column mounting to have as small dimensions as possible, for an adjustment of the height and inclination of the steering column to have an increased adjustment range and for guide elements for adjusting the steering column to be able to be produced cost-effectively.

This object is achieved with a device for adjusting a steering column of a motor vehicle with the features of patent claim 1. Furthermore, the object is achieved with a steering column for a motor vehicle with the features of patent claim 15.

SUMMARY

The present disclosure provides a device for adjusting a steering column of a motor vehicle, comprising a bearing bracket, in which a steering column housing of the steering column is adjustably mounted, first guide means, by means of which the height of the steering column housing is adjustable, and second guide means, by means of which the inclination of the steering column housing is adjustable, wherein the second guide means have at least one first guide plate and at least one second guide plate, which guide plates are movably connected at a first axial end portion to the steering column housing and at a second axial end portion to a fastening device of the bearing bracket, wherein, by means of an adjustment of the inclination of the steering column housing, the at least one first guide plate and the at least one second guide plate are movable counter to each other in the axial direction of the bearing bracket.

The disclosure furthermore provides a steering system for a motor vehicle, with a device for adjusting a steering column of a motor vehicle, and with a steering column housing of the steering column, said steering column housing being mounted adjustably by means of the device.

One concept of the present disclosure is to provide a device for adjusting a steering column of a motor vehicle, which device has smaller dimensions, has a greater adjustment range with regard to an adjustment of the height and inclination of the steering column, the guide elements for adjusting the steering column can be produced cost-effectively, and the device is scalable, that is to say that the guide means are augmented or additional guide means can be added without enlarging the device.

Advantageous embodiments and developments emerge from the dependent claims and from the description with reference to the figures.

According to a preferred development, it is provided that the at least one first guide plate is movably connected at the first axial end portion to a first fastening point on an axial end portion of the steering column housing and is movably connected at the second axial end portion to the fastening device of the bearing bracket, wherein the fastening device of the bearing bracket has a guide pin which is fitted into at least one guide slot of the bearing bracket and is arranged movably along the at least one guide slot of the bearing bracket. The at least one first guide plate is therefore movable in the axial direction of the bearing bracket by means of adjustment of the inclination of the steering column housing.

According to a further preferred development, it is provided that the at least one second guide plate is movably connected at the first axial end portion to a second fastening point, which is arranged substantially opposite the first fastening point of the steering column housing, on the axial end portion of the steering column housing and is movably connected at the second axial end portion to the fastening device of the bearing bracket, wherein the fastening device of the bearing bracket has a guide pin which is fitted into the at least one guide slot of the bearing bracket and is arranged movably along the at least one guide slot of the bearing bracket. The at least one second guide plate is therefore movable in the axial direction of the bearing bracket by means of an adjustment of the inclination of the steering column housing.

According to a further preferred development, it is provided that the at least one first guide plate and the at least one second guide plate have an elongated hole which is formed in the axial direction in the region of the second axial end portion and along which the at least one first guide plate and the at least one second guide plate are arranged movably relative to the guide pin. The provision of the elongated hole in the respective guide plates advantageously brings about the adjustability of the inclination of the steering column housing and of the steering column arranged therein since, during the adjustment of the inclination of the steering column housing, the elongated holes formed in the guide plates are displaceable relative to the guide pins.

According to a further preferred development, it is provided that the bearing bracket has a first bearing plate and a second bearing plate which is arranged substantially parallel thereto at a predetermined distance, which bearing plates are connected to each other by at least one connecting element, wherein the steering column housing of the steering column is mounted adjustably between the first bearing plate and the second bearing plate, wherein the first guide means have a guide slot which is formed in the first bearing plate and the second bearing plate. The height of the steering column housing in which the steering column is accommodated is therefore preferably adjustable along the guide slot formed in the first bearing plate and in the second bearing plate.

According to a further preferred development, it is provided that the first guide means have a further guide pin which is arranged on the steering column housing, is fitted into the guide slot of the first bearing plate and is arranged movably along said guide slot, and have a further guide pin which is arranged on the steering column housing, is fitted into the guide slot of the second bearing plate and is arranged movably along said guide slot. The first and second guide pins therefore advantageously secure the steering column housing transversely with respect to the adjustment direction.

According to a further preferred development, it is provided that the steering column housing is of U-shaped design in the region of the axial end portion with a first limb and a second limb, wherein the first limb in the mounted state is arranged adjacent to the first bearing plate of the bearing bracket and the second limb in the mounted state is arranged adjacent to the second bearing plate of the bearing bracket. The U-shaped design of the steering column housing in the region of the axial end portion preferably has the possibility of attaching guide elements for adjusting an inclination of the steering column housing.

According to a further preferred development, it is provided that the first guide plate is connected at the first axial end portion to the first fastening point on the first limb of the steering column housing, and the second guide plate is connected at the first axial end portion to the second fastening point, which is arranged substantially opposite the first fastening point, on the first limb of the steering column housing, and wherein the first guide means have a third guide plate which is connected at the first axial end portion to the first fastening point on the second limb of the steering column housing, and have a fourth guide plate which is connected at the first axial end portion to the second fastening point, which is arranged substantially opposite the first fastening point, on the second limb of the steering column housing. A force acting on the guide plates during an adjustment of the steering column or a reaction force of the guide plates can therefore be divided between a total of four guide plates. A uniform distribution of force to the mounted guide plates can therefore be ensured in an advantageous manner.

According to a further preferred development, it is provided that the second guide means have a further guide slot which is formed in the first bearing plate and the second bearing plate of the bearing bracket and is arranged offset with respect to the guide slot, which is formed in the first bearing plate and the second bearing plate, in the axial direction of the first bearing plate and the second bearing plate, wherein the first guide plate and the second guide plate are connected at a second axial end portion to a guide pin which is fitted into the further guide slot of the first bearing plate and is arranged movably along the further guide slot of the first bearing plate, and wherein the third guide plate and the fourth guide plate are connected at a second axial end portion to a guide pin which is fitted into the further guide slot of the second bearing plate and is arranged movably along the further guide slot of the second bearing plate. The offset arrangement of the second guide slot relative to the first guide slot of the bearing bracket advantageously permits an improved arrangement of the guide plates with respect to the steering column housing since the force acting on the guide plates during the adjustment of the steering column housing is therefore smaller.

According to a further preferred development, it is provided that the third guide plate and the fourth guide plate have an elongated hole which is formed in the axial direction in the region of a second axial end portion and along which the third guide plate and the fourth guide plate are arranged movably relative to the guide pin. The provision of the elongated hole in the respective guide plates brings about the adjustability of the inclination of the steering column housing and of the steering column arranged therein in an advantageous manner since, during the adjustment of the inclination of the steering column housing, the elongated holes formed in the guide plates are displaceable relative to the guide pins.

According to a further preferred development, it is provided that the second guide means have a first spacer plate which is connected at a first axial end portion to the further guide pin arranged on the steering column housing, and is connected at a second axial end portion to the guide pin which is fitted into the further guide slot of the first bearing plate and is arranged movably along the further guide slot of the first bearing plate. Provision of the first spacer plate makes it possible in an advantageous manner for the first guide means, by means of which the height of the steering column housing is adjustable, and for the second guide means, by means of which the inclination of the steering column housing is adjustable, to be connected to each other.

According to a further preferred development, it is provided that the second guide means have a second spacer plate which is connected at a first axial end portion to the further guide pin arranged on the steering column housing, and is connected at a second axial end portion to the guide pin which is fitted into the further guide slot of the second bearing plate and is arranged movably along the further guide slot of the second bearing plate. Provision of the second spacer plate makes it possible in an advantageous manner for the first guide means, by means of which the height of the steering column housing is adjustable, and for the second guide means, by means of which the inclination of the steering column housing is adjustable, to be connected to one another.

According to a further preferred development, it is provided that the second guide means have a fastening means for fastening the steering column housing in a predetermined height position and/or a predetermined inclination position, wherein the fastening means is designed to press the first guide plate and the second guide plate against an inner wall of the first bearing plate and to press the third guide plate and the fourth guide plate against an inner wall of the second bearing plate, wherein the fastening means is formed by a pneumatic pressure piston, a hydraulic pressure piston or an electromechanical clamping device. A desired height position and inclination position of the steering column can therefore be locked in an advantageous manner by means of the fastening means. Furthermore, the selection of the fastening means can therefore be adapted to respective structural and/or systemic requirements.

According to a further preferred development, it is provided that the first guide plate and the second guide plate are arranged at an angle of 10° to 50°, in particular at an angle of 20° to 40° to each other, and the third guide plate and the fourth guide plate are arranged at an angle of 10° to 50°, in particular at an angle of 20° to 40° to each other. By positioning the guide plates with respect to one another, an improved adjustability of the steering column can be made possible on account of the fastening of respective end portions of the guide plates to respectively oppositely arranged end portions of the steering column housing.

The described refinements and developments can be combined with one another as desired.

Further possible refinements, developments and ways of implementing the disclosure also comprise combinations, which are not explicitly mentioned, of features of the disclosure described previously or below with regard to the exemplary embodiments.

BRIEF DESCRIPTION OF THE DRAWINGS

The attached drawings are intended to impart further understanding of the embodiments of the disclosure. They illustrate embodiments and serve in connection with the description for explaining principles and concepts of the disclosure.

Other embodiments and many of the advantages mentioned emerge in respect of the drawings. The illustrated elements of the drawings are shown not necessarily true to scale with respect to one another.

In the drawings:

FIG. 1 shows a schematic illustration of the device for adjusting a steering column of a motor vehicle according to a preferred embodiment of the disclosure;

FIG. 2 shows a side view of the device for adjusting the steering column of the motor vehicle with a removed bearing plate 12a of the bearing bracket 12 according to the preferred embodiment of the disclosure;

FIG. 3 shows a side view of the device for adjusting the steering column of the motor vehicle with a removed bearing plate 12a of the bearing bracket 12 according to the preferred embodiment of the disclosure;

FIG. 4 shows an enlarged detailed view of the schematic illustration, shown in FIG. 1, of the device for adjusting the steering column of the motor vehicle according to the preferred embodiment of the disclosure;

FIG. 5 shows a side view of the device for adjusting the steering column of the motor vehicle with a removed bearing plate 12b of the bearing bracket 12 according to the preferred embodiment of the disclosure; and FIG. 6 shows a steering system for a motor vehicle with the device for adjusting the steering column of the motor vehicle according to the preferred embodiment of the disclosure.

DETAILED DESCRIPTION

In the figures of the drawings, the same reference signs denote identical or functionally identical elements, components or parts, unless stated otherwise.

Figure 1:
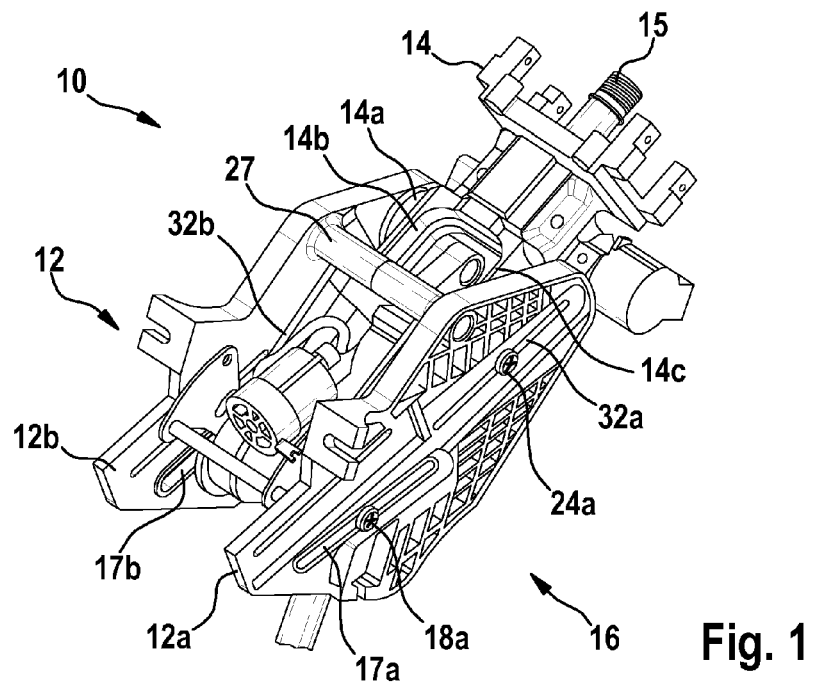

FIG. 1 shows a schematic illustration of the device for adjusting a steering column of a motor vehicle according to a preferred embodiment of the disclosure.

The device 10 for adjusting the steering column 15 of the motor vehicle has a bearing bracket 12, in which a steering column housing 14 of the steering column 15 is adjustably mounted. The bearing bracket 12 preferably has a first bearing plate 12a and a second bearing plate 12b. The first bearing plate 12a and the second bearing plate 12b are preferably arranged at a predetermined distance from each other and substantially parallel to each other. The first bearing plate 12a and the second bearing plate 12b are preferably connected to each other by a connecting element 27. The connecting element 27 can be, for example, of hollow-cylindrical design.

The device 10 for adjusting the steering column of the motor vehicle furthermore has first guide means 16, by means of which the height of the steering column housing 14 is adjustable. The first guide means 16 have a guide slot 17a, which is formed in the first bearing plate 12a, and a guide slot 17b, which is formed in the second bearing plate 12b.

The first guide means 16 furthermore have a further guide slot 32a, which is formed in the first bearing plate 12a and is arranged offset with respect to the guide slot 17a, and a further guide slot 32b, which is formed in the second bearing plate 12b and is arranged offset with respect to the guide slot 17b.

The first guide means 16 moreover preferably have a guide pin 18a, which is arranged on the first bearing plate 12a of the bearing bracket 12, and a guide pin (not shown in FIG. 1), which is arranged on the second bearing plate 12b of the bearing bracket 12. The guide pin 18a is preferably fitted into the guide slot 17a of the first bearing plate 12a and is arranged movably along said guide slot. The guide pin 18b (not shown in FIG. 1) is preferably fitted into the guide slot 17b of the second bearing plate 12b and is arranged movably along said guide slot.

The steering column housing 14 is furthermore of U-shaped design in the region of the axial end portion 14a. The steering column housing 14 has a first limb 14b and a second limb 14c. The first limb 14b is preferably arranged in the mounted state adjacent to the first bearing plate 12a of the bearing bracket 12. The second limb 14c is arranged in the mounted state preferably adjacent to the second bearing plate 12b of the bearing bracket 12.

The further guide slot 32a is preferably formed in the first bearing plate 12a. A further guide pin 24a is arranged in an advantageous manner in the further guide slot 32a. The further guide slot 32b is preferably formed in the second bearing plate 12b. A further guide pin 24b is preferably arranged in the further guide slot 32b. The further guide pins 24a, 24b are preferably connected to a fastening means 38 (not shown in FIG. 1) for fastening the steering column housing 14 in a predetermined height position and/or a predetermined inclination position.

Figure 2:
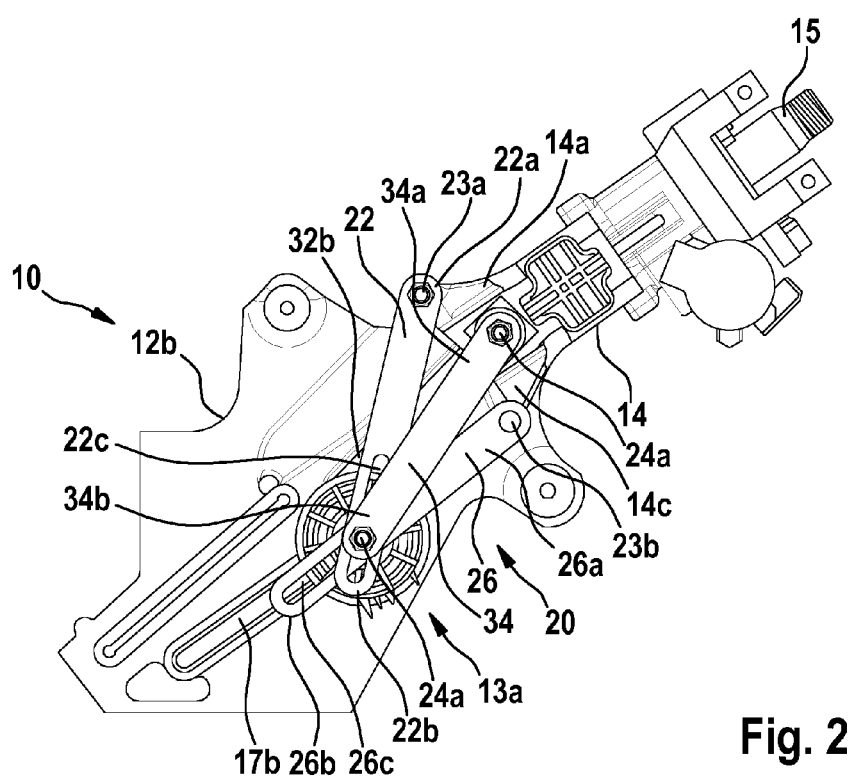

FIG. 2 shows a side view of the device for adjusting the steering column of the motor vehicle with a removed bearing plate 12a of the bearing bracket 12 according to the preferred embodiment of the disclosure.

The device 10 for adjusting the steering column of the motor vehicle furthermore has second guide means 20, by means of which the inclination of the steering column housing 14 is adjustable. The second guide means 20 have a first guide plate 22 and a second guide plate 26. Furthermore, the second guide means have a third guide plate (not shown in FIG. 2) and a fourth guide plate (not shown in FIG. 2). The first guide plate 22 is connected at a first axial end portion 22a to a first fastening point 23a on an axial end portion 14a of the steering column housing 14. The first guide plate 22 is furthermore preferably connected at a second axial end portion 22b to a guide pin 18a which is fitted into the guide slot 17a (not shown in FIG. 2) of the bearing bracket 12 and is arranged movably along the guide slot 17a (not shown in FIG. 2) of the bearing bracket 12.

The second guide means 20 furthermore preferably have a second guide plate 26 which is connected at a first axial end portion 26a to a second fastening point 23b, which is arranged substantially opposite the first fastening point 23a of the steering column housing 14, on the axial end portion 14a of the steering column housing 14. The second guide plate 26 is furthermore preferably connected at a second axial end portion 26b to the guide pin 18a which is fitted into the guide slot 17a (not shown in FIG. 2) of the bearing bracket 12 and is arranged movably along the guide slot 17a (not shown in FIG. 2) of the bearing bracket 12.

The first guide plate 22 and the second guide plate 26 furthermore preferably have an elongated hole 22c, 26c formed in the axial direction in the region of the second axial end portion 22b, 26b. The first guide plate 22 and the second guide plate 26 are preferably arranged movably along their respective elongated hole 22c, 26c relative to the guide pin 18a.

The second guide means 20 furthermore preferably have a first spacer plate 34. The first spacer plate 34 is connected at a first axial end portion 34a to the further guide pin 24a arranged on the steering column housing 14. The spacer plate 34 is furthermore preferably connected at a second axial end portion 34b to the guide pin 18a which is fitted into the guide slot 17a of the first bearing plate 12a and is arranged movably along the guide slot 17a of the first bearing plate 12a.

The steering column housing 14 of the steering column 15 is illustrated, preferably in a driving position, in FIG. 2. In the driving position illustrated in FIG. 2, the steering column is locked in a predetermined height position and in a predetermined inclination position.

Figure 3:
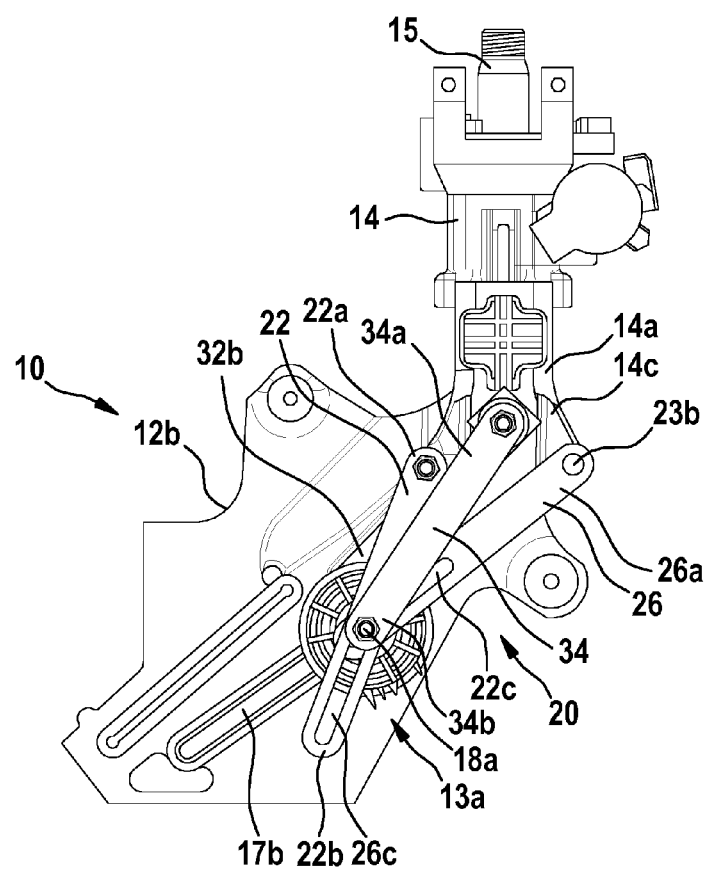

FIG. 3 shows a side view of the device for adjusting the steering column of the motor vehicle with a removed bearing plate 12a of the bearing bracket 12 according to the preferred embodiment of the disclosure.

The device 10 shown in FIG. 2 for adjusting the steering column of the motor vehicle is arranged in FIG. 3 in such a manner that the steering column is arranged substantially vertically. This corresponds to an easy-entry position, by means of which easier entering into and exiting from a driver's cab is made possible.

In the easy-entry position illustrated in FIG. 3, the steering column housing 14 is arranged in a maximum height position in which the further guide pin 24a is arranged in an uppermost position in the further guide slot 32a (not shown in FIG. 3) of the first bearing plate 12a of the bearing bracket 12.

The second guide means 20, which have the first guide plate 22 and the second guide plate 26, are likewise maximally deflected in the position of the steering column housing illustrated in FIG. 3. In the position of the steering column housing 14, the first fastening point 23a of the first guide plate 22 and the second fastening point 23b of the second guide plate 26 lie on the same horizontal plane. During adjustment of the steering column housing 14 from the driving position into the easy-entry position, the first guide plate 22 is therefore pressed substantially downward and the second guide plate 26 is pulled upward.

Figure 4:
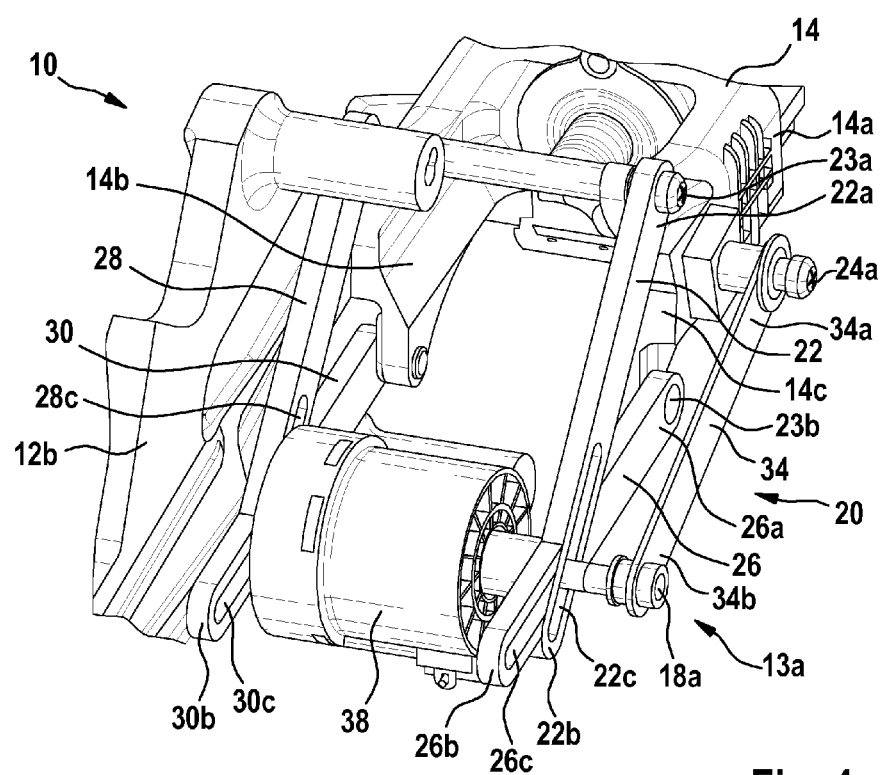

FIG. 4 shows an enlarged detailed view of the schematic illustration, shown in FIG. 1, of the device for adjusting the steering column of the motor vehicle according to the preferred embodiment of the disclosure.

The second guide means 20 preferably have a fastening means 38 for fastening the steering column housing 14 in a predetermined height position and/or a predetermined inclination position. The fastening means 38 is preferably designed to press the first guide plate 22 and the second guide plate 26 against an inner wall (not shown in FIG. 4) of the first bearing plate 12a and to press the third guide plate 28 and the fourth guide plate 30 against an inner wall (not shown in FIG. 4) of the second bearing plate 12b.

The guide plates 22, 26, 28, 30 are preferably designed as plate packs. Each of the guide plates 22, 26, 28, 30 preferably has a plurality of plates which are fastened to one another and, in the mounted state, form the plate pack.

The fastening means 38 is preferably formed by a pneumatic pressure piston. Alternatively, the fastening means 38 can be formed, for example, by a hydraulic pressure piston or an electromechanical clamping device.

Figure 5:
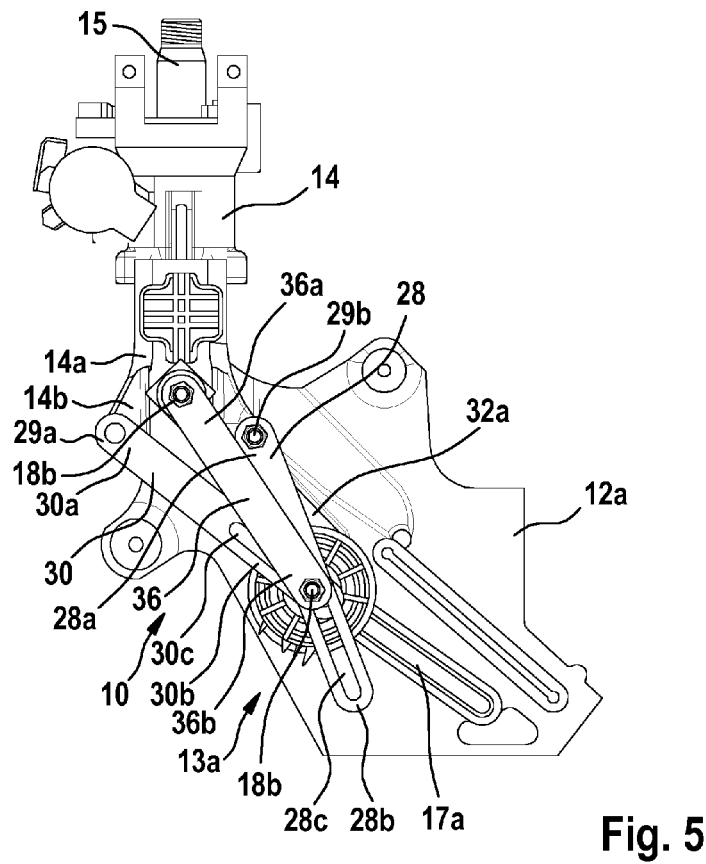

FIG. 5 shows a side view of the device for adjusting the steering column of the motor vehicle with a removed bearing plate 12b of the bearing bracket 12 according to the preferred embodiment of the disclosure.

FIG. 5 shows the third guide plate 28 and the fourth guide plate 30. The third guide plate 28 and the fourth guide plate 30 preferably have an elongated hole 28c, 30c formed in the axial direction in the region of a second axial end portion 28b, 30b. Along said elongated hole 28c, 30c, the third guide plate 28 and the fourth guide plate 30 are arranged movably relative to the guide pin 18b.

The second guide means 20 furthermore preferably have a second spacer plate 36. The second spacer plate 36 is connected in an advantageous manner at a first axial end portion 36a to the further guide pin 24b arranged on the steering column housing. The second spacer plate 36 is furthermore connected preferably at a second axial end portion 36b to the guide pin 18b which is fitted into the guide slot 17b (not shown in FIG. 5) of the second bearing plate 12b and is arranged movably along the guide slot 17b of the second bearing plate 12b.

Figure 6:
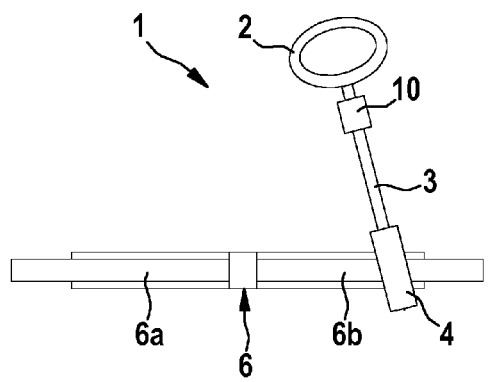

FIG. 6 shows a steering system for a motor vehicle with the device for adjusting the steering column of the motor vehicle according to the preferred embodiment of the disclosure.

The steering system 1 is located in a motor-driven vehicle, in particular in a passenger vehicle or a utility vehicle. The steering system comprises a steering wheel 2 which is to be operated by the driver, acts via a steering column 3 upon a vehicle wheel via a steering mechanism 4 and adjusts said vehicle wheel in accordance with the driver's requirements.

The height and inclination of the steering column 3 are adjustable by means of the device 10 for adjusting the steering column 3 of the motor vehicle.

The steering system 1 preferably has a hydraulic unit (not shown in FIG. 6) which is connected to a positive-displacement pump (not shown in FIG. 6) which acts with a hydraulic pressure upon a first chamber 6a of a consumer or adjustment cylinder 6 and upon a second chamber 6b of the adjustment cylinder 6 via the hydraulic unit and corresponding hydraulic lines (not shown in FIG. 6).

Although the present disclosure has been described above with reference to preferred exemplary embodiments, it is not restricted thereto, but rather can be modified in diverse ways. In particular, the disclosure can be modified in manifold ways without departing from the essence of the disclosure.

For example, the bearing bracket can have another suitable shape which is adapted in an advantageous manner to a shape of the steering column housing. Furthermore, the guide plates can be augmented in a simple manner by enlarging the plate pack.

The invention claimed is:

1. A device for adjusting a steering column of a motor vehicle, comprising:
   a bearing bracket that includes a fastening device and that is configured to adjustably mount a housing of the steering column;
   a first guide mechanism configured to adjust a height of the steering column housing in the bearing bracket; and
   a second guide mechanism configured to adjust an inclination of the steering column housing in the bearing bracket, the second guide mechanism including:
      at least one first guide plate having a first axial end portion that is configured to movably connect to the steering column housing, and a second axial end portion movably connected to the fastening device of the bearing bracket; and
      at least one second guide plate having a first axial end portion configured to movably connect to the steering column housing, and a second axial end portion movably connected to the fastening device of the bearing bracket;
      wherein the at least one first guide plate and the at least one second guide plate are configured to move counter to each other along an axial direction of the bearing bracket with an adjustment of the inclination of the steering column housing.

2. The device as claimed in claim 1, wherein:
   the first axial end portion of the at least one first guide plate is configured to movably connect to a first fastening point on an axial end portion of the steering column housing;
   the bearing bracket further includes at least one guide slot; and
   the fastening device of the bearing bracket includes a guide pin fitted into the at least one guide slot so as to be movable along the at least one guide slot of the bearing bracket.

3. The device as claimed in claim 2, wherein:
   the first axial end portion of the at least one second guide plate is configured to movably connect to a second fastening point of the steering column housing arranged substantially opposite the first fastening point.

4. The device as claimed in claim 2, wherein:
   the second axial end portion of each of the at least one first guide plate and the at least one second guide plate has a respective elongated hole formed along the axial direction of the bearing bracket; and
   the at least one first guide plate and the at least one second guide plate are configured to move along the axial direction of the bearing bracket relative to the guide pin.

5. The device as claimed in claim 1, wherein:
   the bearing bracket further includes:
      a first bearing plate;
      a second bearing plate positioned substantially parallel the first bearing plate at a predetermined distance; and
      at least one connecting element that connects the first bearing plate and the second bearing plate to each other;
   the bearing bracket is configured to adjustably mount the steering column housing between the first bearing plate and the second bearing plate; and
   the first guide mechanism includes a respective further guide slot formed in each of the first bearing plate and the second bearing plate.

6. The device as claimed in claim 5, wherein the first guide mechanism further includes:
   a first further guide pin positioned so as to be on the steering column housing in a mounted state of the steering column, and fitted into the further guide slot of the first bearing plate so as to be movable along the further guide slot of the first bearing plate; and
   a second further guide pin positioned so as to be on the steering column housing in the mounted state and fitted into the further guide slot of the second bearing plate so as to be movable along the further guide slot of the second bearing plate.

7. The device as claimed in claim 5, wherein:
   the axial end portion of the steering column housing has a U-shaped body with a first limb and a second limb; and
   the bearing bracket is further configured such that:
      the first limb, in the mounted state, is adjacent to the first bearing plate of the bearing bracket; and
      the second limb, in the mounted state, is adjacent to the second bearing plate of the bearing bracket.

8. The device as claimed in claim 7, wherein:
   the first axial end portion of the at least one first guide plate is configured to connect to a first fastening point on the first limb;
   the first axial end portion of the at least one second guide plate is configured to connect to a second fastening point arranged substantially opposite the first fastening point on the first limb;
   the first guide mechanism further includes:
      a third guide plate having a first axial end portion configured to connect to a first fastening point on the second limb of the steering column housing; and
      a fourth guide plate having a first axial end portion configured to connect to a second fastening point arranged substantially opposite the first fastening point on the second limb of the steering column housing.

9. The device as claimed in claim 8, wherein:
   the second guide mechanism further includes:
      a respective guide slot formed in each of the first bearing plate and the second bearing plate of the bearing bracket so as to be offset with respect to the further guide slot in an axial direction of the first bearing plate and the second bearing plate;
      a further guide pin fitted into the guide slot of the second bearing plate so as to be movable along the guide slot of the second bearing plate;
   the second axial end portion of each of the first guide plate and the second guide plate are connected to the guide pin; and
   a second axial end portion of each of the third guide plate and the fourth guide plate are connected to the further guide pin.

10. The device as claimed in claim 8, wherein:
    a second axial end portion of each of the third guide plate and the fourth guide plate has an elongated hole formed along the axial direction of the bearing bracket; and
    the third guide plate and the fourth guide plate are configured to move along the axial direction of the bearing bracket relative to the further guide pin.

11. The device as claimed in claim 8, wherein the second guide mechanism further includes a first spacer plate having:
    a first axial end portion connected to the first further guide pin arranged on the steering column housing; and
    a second axial end portion connected to the guide pin.

12. The device as claimed in claim 6, wherein the second guide mechanism further includes a second spacer plate having:
- a first axial end portion connected to the second further guide pin arranged on the steering column housing; and
- a second axial end portion connected to the further guide pin.

13. The device as claimed in claim 11, wherein:
- the second guide mechanism further includes a fastening mechanism configured to fasten the steering column housing in at least one of a predetermined height position and a predetermined inclination position by pressing the at least one first guide plate and the at least one second guide plate against an inner wall of the first bearing plate and pressing the third guide plate and the fourth guide plate against an inner wall of the second bearing plate; and
- the fastening mechanism is a pneumatic pressure piston, a hydraulic pressure piston or an electromechanical clamping device.

14. The device as claimed in claim 1, wherein the at least one first guide plate and the at least one second guide plate are arranged at an angle of 10° to 50° relative to each other, and the third guide plate and the fourth guide plate are arranged at an angle of 10° to 50 relative to each other.

15. A steering system for a motor vehicle, comprising:
- a steering column including a housing; and
- a device that is configured to adjust the steering column, and that includes:
  - a bearing bracket having a fastening device; the housing of the steering column adjustably mounted in the bearing bracket;
  - a first guide mechanism configured to adjust a height of the steering column housing in the bearing bracket; and
  - a second guide mechanism configured to adjust an inclination of the steering column housing in the bearing bracket, the second guide mechanism having:
    - at least one first guide plate with a first axial end portion movably connected to the steering column housing, and a second axial end portion movably connected to the fastening device of the bearing bracket; and
    - at least one second guide plate with a first axial end portion movably connected to the steering column housing, and a second axial end portion movably connected to the fastening device of the bearing bracket;
    - wherein the at least one first guide plate and the at least one second guide plate are configured to move counter to each other along an axial direction of the bearing bracket with an adjustment of the inclination of the steering column housing.

16. The device as claimed in claim 14, wherein the at least one first guide plate and the at least one second guide plate are arranged at an angle of 20° to 40° relative to each other.

17. The device as claimed in claim 14, wherein the third guide plate and the fourth guide plate are arranged at an angle of 20° to 40° relative to each other.

* * * * *